United States Patent [19]

Schumacher et al.

[11] 4,298,037
[45] Nov. 3, 1981

[54] METHOD OF SHIPPING AND USING SEMICONDUCTOR LIQUID SOURCE MATERIALS

[75] Inventors: John C. Schumacher; André Lagendijk, both of Oceanside, Calif.

[73] Assignee: J. C. Schumacher Co., Oceanside, Calif.

[21] Appl. No.: 123,563

[22] Filed: Feb. 22, 1980

Related U.S. Application Data

[60] Continuation of Ser. No. 940,470, Sep. 8, 1978, abandoned, which is a division of Ser. No. 746,923, Dec. 2, 1976, abandoned.

[51] Int. Cl.³ .......................... B65B 3/00; B65D 25/08
[52] U.S. Cl. ..................................... 141/1; 137/68 R; 206/219; 206/818; 261/124
[58] Field of Search ............... 53/22 R, 37; 137/68 R; 206/219, 220, 818; 215/32, 250; 220/855, 89 A; 251/65; 261/124; 141/1, 65

[56] References Cited

U.S. PATENT DOCUMENTS

| | | | |
|---|---|---|---|
| 2,419,112 | 4/1947 | Brandt | 141/65 X |
| 3,053,413 | 9/1962 | Feuer | 137/68 R X |
| 3,924,648 | 12/1975 | Etter | 261/124 |

*Primary Examiner*—Frederick R. Schmidt
*Attorney, Agent, or Firm*—Knobbe, Martens, Olson, Hubbard and Bear

[57] ABSTRACT

The gas inlet tube and the outlet tube in the upper end of a "bubbler" container are each sealed with an easily breakable wall adjacent the wall where the tubes join the container. A second seal is formed on the outer ends of the tubes creating a compartment in which may be positioned a small hammer. The outer seals are sufficient to meet safety regulations regarding the shipment of highly corrosive or poisonous materials. The user of the material, breaks the outer seals, positions the hammer if not already in place, makes the desired connections to the tubes, applies a purging gas to the upper ends of the tubes, and breaks the inner seals by magnetically or otherwise actuating the hammer resting on the inner seal, thereby connecting the material to the desired system without exposing the material to the atmosphere.

8 Claims, 3 Drawing Figures

U.S. Patent
Nov. 3, 1981
4,298,037
FIG. 1.
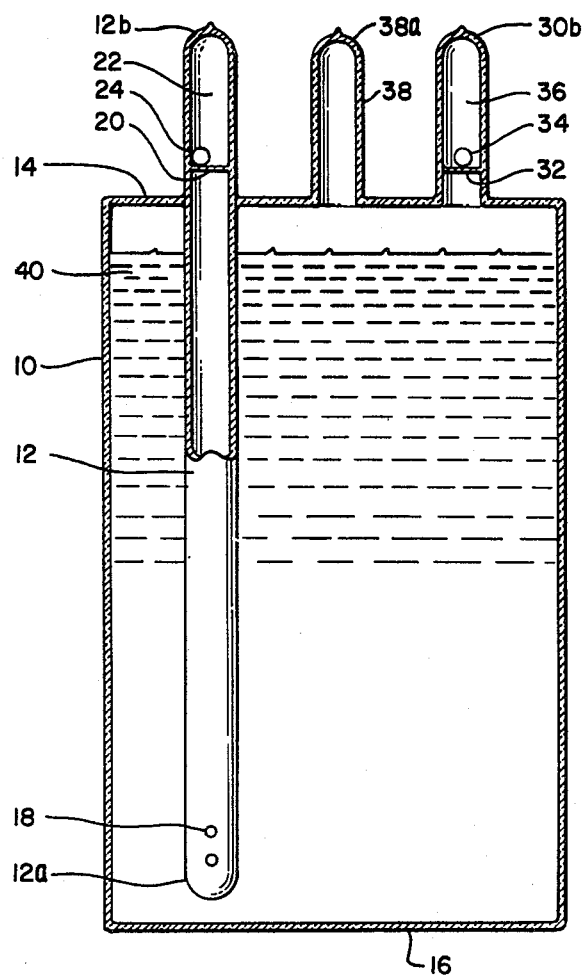
FIG. 2.
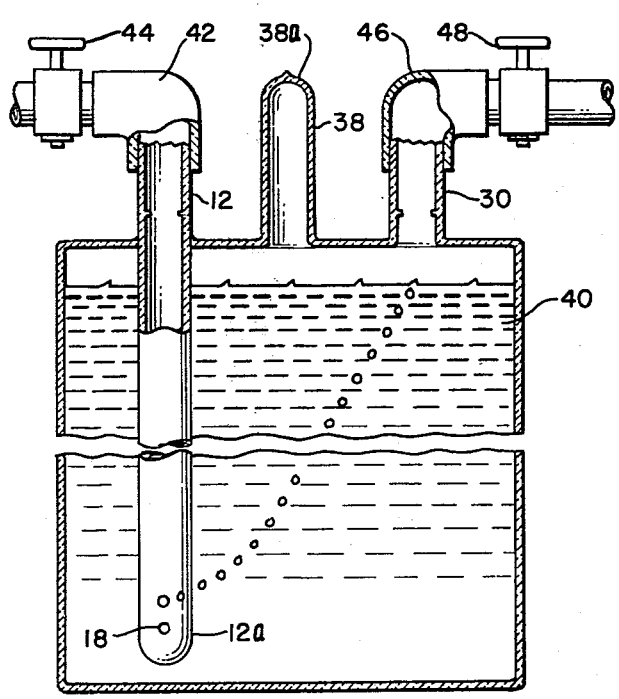
FIG. 3.

METHOD OF SHIPPING AND USING SEMICONDUCTOR LIQUID SOURCE MATERIALS

CROSS REFERENCE TO RELATED APPLICATIONS

This is a continuation of application Ser. No. 940,470, filed Sept. 8, 1978 now abandoned entitled LIQUID SOURCE MATERIAL CONTAINER AND METHOD OF USE FOR SEMI-CONDUCTOR DEVICE MANUFACTURING, which in turn is a divisional of application Ser. No. 746,923, filed Dec. 2, 1976 now abandoned.

This invention relates to an improved container and method for shipping and using materials without exposing them to atmosphere and more particularly to a system for handling high-purity liquid source materials used in the manufacturing of semiconductor devices.

It is well established that the successful manufacturing of semiconductor devices is dependent upon use of high-purity raw materials. Although it is more difficult to prove that use of higher and higher purity raw materials produces continued yield improvement (number of acceptable devices per raw material lot) because of the large number of variables affecting yield, such as operator error, manufacturing aid purity, equipment cleanliness, etc., this assumption is generally held throughout the industry. Reliability improvements as a direct result of purity improvements however, are easily demonstrable as are improvements in basic physical parameters such as junction leakage, flat band voltage shift, minority carrier lifetime, etc. Thus optimal use of raw materials requires that they be of the ultimate purity achieveable.

Manufacturing of semiconductor devices is a high-volume, low unit cost process. Competitive pressures result in drastic price erosion with time for a given semiconductor device until the high volume, low unit cost equilibrium state is achieved. Since the device yield, as defined above, is dependent upon raw material purity, the equilibrium or profitable state requires constant raw material purity.

Some of the liquid source materials used in the manufacturing of semiconductor devices are boron tribromide, phosphorous oxychloride, phosphorous tribromide, silicon tetrabromide, arsenic trichloride, assenic tribromide, antimony pentachloride and any combination of the above.

Since these liquid source materials are to varying degrss hazardous, they require a minimum or zero exposure to worker's handling them. Also, such corrosives, Class B poisons and the like are subject to Department of Transportation and other governmental regulations concerning the transportation of such materials. Thus, these factors must also be taken into consideration in shipping and using these liquid source materials.

Presently, the system most widely used is that the liquid source materials are shipped in flame sealed glass containers or ampoules. Department of Transportation regulations further specify that such containers must be capable of holding fifteen psi gage. The regulations also permit use of steel drums having specified characteristics; however, such containers are unsatisfactory for the liquid source materials discussed above. Metallic impurities such as the alkali and alkaline earth metals as well as the transition metals are particularly harmful to the reliable manufacturing of semiconductor devices.

Even flame sealed glass containers, although preferable to metal containers can degrade the liquid source material through "leaching" on their matrix and impurity atoms by the liquid source material over a period of time. This leaching process is in turn accelerated by analog acid formation within the liquid as a result of exposure to atmospheric moisture. For example, hydrobromic acid is formed rapidly on exposure of boron tribromide to the atmosphere: $2BBr_3 + 3H_2O \rightarrow B_2O_3 + 6HBr$.

The manner in which the liquid source materials have been handled has permitted some exposure to the atmosphere which is not only harmful to purity, but also exposes personnel to hazardous materials. More specifically, after the liquid source material is delivered in the glass ampoule, the user breaks the tip of the ampoule and pours the source material into a "bubbler" container. The "bubbler" has an inlet tube that extends through the upper end of the container and terminates near the lower end, and also has an outlet tube. An inert "carrier gas" such as nitrogen or argon is bubbled into the liquid source material which causes the carrier gas to become saturated with the vapor of the source material. The saturated carrier gas is then fed down stream from the bubbler through a series of valves and transfer tubes into a "diffusion" furnace or thin film reactor to perform its desired function in the production of semiconductor devices.

In this process, the operation of importance is the transfer from the glass ampoule to the bubbler. Here atmospheric exposure occurs causing analog acid to be formed leading to immediate, and continued contamination of the source material by the glass ampoule and the glass bubbler. Note that this both degrades purity and causes it to be time dependent until equilibrium is reached, which may require an extended period. Both of these conditions are undesirable.

In accordance with the present invention, an improved container and method of handling the material is disclosed which satisfies the various requirements of avoiding contamination, avoiding exposure risks to workers, and meeting shipping regulations. This is accomplished by shipping and using the source materials in the same container, avoiding atmospheric exposure and providing the container with a sealing arrangement that will meet safety regulations. This container is provided with a double seal, an outer seal which satisfies pressure requirements of the shipping regulations and an inner seal that can be easily broken after the connections have been made to the container.

More specifically, the container, like a conventional "bubbler", has an inlet tube which extends through a wall in the upper portion of the container and terminates near the bottom wall of the container and an outlet tube. A thin breakable wall is formed across the inlet and outlet tubes near the point where the tubes are attached to the container. The outer ends of the tubes are then closed by flame-sealing or other manner which will meet shipping regulation requirements.

When the bubbler is received by the user, the external seal is removed and the bubbler is connected into the using system. The space in the inlet and tubes between the shutoff valves and the secondary or breakable seals are then flushed with clean dry inert gas to remove atmospheric moisture collected there during the time between removal of the external seal and the making of the connections joining the bubbler to the system. The breakable seals are then broken by appropriate means. For example, a quartz enclosed metal hammer may be positioned in the inlet and outlet tubes above the breakable seal. This can be done by the party marketing the bubbler and the liquid source material or it can be done by the user after the outer seal has been removed. Such a hammer is movable magnetically such as by moving a small magnet adjacent the exterior of the tube so as to lift the hammer and then removing the magnet or moving it quickly downwardly causing the hammer to break the thin wall of quartz forming the secondary seal. In this manner, the liquid source material is shipped and utilized without atmospheric exposure.

Although the bubbler and hammer enclosure are preferably made of quartz, possibly other materials can be utilized which will meet the necessary requirements.

For a more thorough understanding, refer now to the following detail specification and drawings in which:

FIG. 1 is a cross-sectional view of the container of the invention as it is shipped;

FIG. 2 is a cross-sectional view showing the container after the inlet and outlet connections to the container have been made and the inner seals have been broken; and FIG. 3 is an enlarged cross-sectional view of one of the tubes illustrating the manner in which the inner seal is broken.

Referring now to FIG. 1, there is shown a cylindrical container 10 forming a sealed chamber with an inlet tube 12 extending through and secured to the upper wall 14 of the container. The lower end 12a of the tube terminates near the bottom wall 16 of the container and has one or more openings 18 in its lower end. The upper portion of the tube 12 extends above the upper container wall 14 and the upper end 12b is closed. The container and the tube is preferably made of quartz and hence, the upper end may conveniently be flame-sealed.

A thin internal wall 20 extends across the tube at a point adjacent or slightly above the upper wall 14, and is spaced from the upper end 12b to form a small compartment 22. The wall 20 thus forms an internal second seal blocking entry to the container through the inlet tube 12. The wall 20 is made quite thin so that it is readily frangible or breakable. Shown positioned on the wall 20 is a small hammer 24 consisting of a small piece of magnetically attracted metal encased in quartz.

An outlet tube 30 is shown with its lower end attached to the upper wall 14 of the container and open to the container interior. The tube upper end 30b is closed by flame-sealing or other suitable means. As with the inlet tube, there is provided a thin internal wall 32 which forms a second seal for the container through the tube 30. Also, as with the inlet tube, there is provided a small hammer 34 located on the wall 32 in the compartment 36 between the wall 33 and the upper end 30b of the tube 30.

A third tube 38 used for filling the container, is attached to the upper wall 14 of the container, with the upper end 38a of tube 38 being shown in closed condition after the filling operation.

As explained above, the primary purpose for the container 10 is to hold ultra high purity liquid source material used in connection with the manufacturing of semiconductor devices. Most of such liquids are dangerous because of their corrosive or toxic characteristics. Thus, care is taken in positioning the liquid 40 in the container in a manner to maintain its purity and to properly protect the personnel. The liquid is shipped to the user in the container shown, consequently, the seals 12b, 30b and 38a on the upper ends of the tubes as well as the rest of the exterior portions of the container must be able to withstand at least fifteen psi gage pressure since that is a current requirement for such materials by the Department of Transportation of the United States Government. The internal seals 20 and 32 in the inlet and outlet tubes respectively may not be sufficient to handle such pressures which is one of the reasons the outer seals are provided.

After the container has reached the user it can be used as a bubbler in utilizing the liquid 40 in a semiconductor device manufacturing process. First, the upper ends 12b and 30b of the inlet and outlet tubes are opened. Hammers 24 and 34 are then positioned above seals 20 and 32 if not received in that position. An inlet connection 42 with a valve 44 is connected to the open upper end of the inlet tube 12 and a similar connection 46 with a valve 48 is made to the open upper end of the outlet tube 30 as shown in FIG. 2. The connections and the open upper ends of the tubes are then bathed in an inert gas such as nitrogen or argon to remove any moisture that may have gotten into that area while the connections were being made.

The inner seals 20 and 32 on the inlet and outlet tubes can now be safely broken without concern for the liquid 40 being exposed to the atmosphere. These walls are broken by positioning a magnet 50 adjacent the magnetic hammer 24 and raising the magnet, which causes the hammer to follow, and removal of the magnet will cause the hammer to fall and break the seal. The hammer encased in quartz to prevent contamination can fall harmlessly into the lower end of the tube 12 or into the container 10, in the case of the outlet tube 30.

The interior of the container is now open to the inlet and outlet connections 42 and 46 and the liquid source material 40 within the container has not been exposed to the atmosphere. Nitrogen or some other inert gas is now applied to the container through the inlet tube 12 so that it bubbles upwardly through the liquid source material becoming saturated with the material, and then leaves the container by way of the outlet tube 30 to be utilized in the manufacturing process of the semiconductor devices.

What is claimed is:

1. A method of packaging liquid for shipment which permits said liquid after receipt by a user, to be used in a manner which avoids exposure of said liquid to the atmosphere comprising:

positioning said liquid in a bubbler container having an inlet tube connected thereto which extends into the interior of the container and terminates near the bottom of the container, said tube having an opening in its lower end so that gas may be applied to the upper end of the tube and be allowed to escape out of the lower end of the tube and bubble through the liquid, said container further having an outlet tube connected to the upper end of the container;

forming an inner, easily breakable seal across each of said tubes which prevents leakage of said material; and forming a second seal across each of said tubes spaced outwardly from said first seal, said outer seals meeting safety shipping regulations including providing a positive seal that prevents leakage and can withstand an internal pressure of 15 PSI gauge, to permit said double sealed container to be shipped to a user so that after the shipment reaches said user, the outer seals can be manually broken without breaking said inner seals, connections made to the tubes, the area of said tubes above said inner seals purged of atmosphere and said inner seals independently broken by suitable means not requiring access to the interior of the tubes.

2. A method of packaging for shipment and use ultra-high purity liquids used in the manufacture of semiconductor devices in a manner to minimize the possibility of contamination of the liquid including the avoidance of exposure to the atmosphere, said method comprising:

positioning said liquid in a bubbler container made of quartz or other material which is highly inert with respect to the liquid, said container having an inlet tube connected thereto which extends into the interior of the container and terminates near the bottom of the container, said tube having an opening in its lower end so that gas may be applied to the upper end of the tube and be allowed to escape out of the lower end of the tube and bubble upwardly through the liquid, said container further having an outlet tube connected to the upper end of the container;

forming a readily breakable inner seal across said tubes, said seal may be made of the same material that the container is made of;

forming a second seal across said tube spaced outwardly from said inner seal, said outer seal being stronger than said inner seal and formed in a manner that will meet safety shipping regulations for said liquid including providing a positive seal that prevents leakage and can withstand an internal pressure of 15 PSI gauge;

shipping said double sealed container to a user; and independently and sequentially breaking said inner and outer seals so that connections may be made to said tube to place said container in a using system after breaking said outer seal and without exposing said liquid to said atmosphere.

3. The method of claim 2 including the steps of:

making an inlet connection to the outer end of said inlet tube and an outlet connection to the outlet tube;

applying an inert gas to the interior of said connections and the inner upper end of said tubes above said inner seals to remove any moisture; and externally breaking said inner seals without manual access to the interior of the tubes to expose said liquid to said inlet connection with the result that the inlet and outlet tubes are connected into said using system without having said liquid exposed to atmosphere during shipment and use.

4. The method of claim 3 wherein said inner seal is made of quartz and said breaking step is performed by magnetically moving a magnetically attracted hammer that was previously positioned between said outer and said inner seal.

5. A method of acquiring and using high-purity liquids employed in connection with the manufacture of semiconductor devices comprising the steps of:

acquiring an ultra high purity liquid material, prepackaged in a bubbler comprising a closed container having an inlet tube which extends out the upper end of the container and into the lower end, and having an outlet tube extending out of the upper end of the container, each of said tubes having a seal on its outer upper end sufficient to meet shipping requirements including providing a positive seal which prevents leakage and can withstand an internal pressure of 15 PSI gauge, said container having an inner easily breakable seal across said tube spaced from said outer seal;

independently breaking said outer seal without breaking said inner seal;

connecting the upper end of said inlet and outlet tubes to the system employed in the manufacture of semiconductor devices;

applying an inert gas to said connections and the inner upper ends of said inlet and outlet tubes to purge said tubes above said inner seals of moisture and atmosphere accumulating subsequent to said breaking of said outer seals; and externally breaking said inner seals without manual access to the interior of the tubes to expose said liquid material to said system without contamination of said material.

6. A method of packaging and using ultra-high purity liquids used in the manufacturing of semiconductor devices such as boron tribromide, phosphorous oxychloride, phosphorous tribromide, silicon tetrabromide, arsenic trichloride, arsenic tribromide, antimony petachloride and combinations thereof, in a manner to minimize the possibility of contamination of the liquid including the avoidance of exposure to the atmosphere, said method comprising:

positioning said liquid in a bubbler container made of quartz or other material which is inert which respect to said liquid said container having an inlet tube which extends into said container adjacent the upper end of said container and terminates adjacent the lower end of said container so as to be immersed in said liquid and an outlet tube extending out of the upper end of said container, each of said tubes having an inner and an outer liquid-tight seal formed adjacent its upper end;

shipping said container from the location where the liquid is added to the container to the user of the liquid, said seals being closed when the container is shipped;

opening said outer seals and connecting the upper end of said inlet and outlet tubes to a system employed for the manufacture of semiconductor devices;

applying purging means to said connections and the upper ends of said inlet and outlet tubes to purge said tubes above said inner liquid-tight seals of moisture and atmosphere accumulated therein;

opening said inner seals by means disposed within said tubes and movable by external means, not requiring access to the interior of said tube, to expose said liquid to said system without exposing said liquid to the atmosphere around the container; and applying a carrier gas into the inlet tube, said gas traveling through said inlet tube, bubbling upward through said liquid and exiting said container through said outlet tube.

7. A method of packaging and using ultra-high purity liquids used in the manufacturing of semi-conductor devices such as boron tribromide, phosphorous oxychloride, phosphorous tribromide, silicon tetrabromide, arsenic trichloride, arsenic tribromide, antimony pentachloride and combinations thereof, in a manner to minimize the possibility of contamination of the liquid including the avoidance of exposure to the atmosphere, said method comprising:

positioning said liquids in a bubbler container made of quartz or other material which is inert with respect to said liquid, said container having an inlet tube which extends into said container adjacent the upper end of said container and terminates adjacent the lower end of said container so as to be immersed in said liquid, and an outlet tube extending out of the upper end of said container, each of said tubes having a liquid-tight seal formed adjacent its upper end, shipping said container from the location where the liquid is added to the container to the user of the liquid with said seals being closed when the container is shipped;

connecting the upper ends of said inlet and outlet tubes to a system employed for the manufacture of semiconductor devices;

applying purging means to said connections and the upper ends of said inlet and outlet tubes to purge said tubes outwardly from said liquid-tight seals of moisture and atmosphere accumulated therein;

opening said seals by means disposed within said tubes and movable by external means, not requiring access to the interior of said tube, to expose said liquid to said system without exposing said liquid to the atmosphere around the container; and applying a carrier gas into the inlet tube, said gas traveling through said inlet tube, bubbling upward through said liquid and exiting said container through said outlet tube.

8. A method of handling and utilizing an untra-high purity liquid used in the manufacturing of semiconductor devices such as boron tribromide, phosphorous oxychloride, phosphorous tribromide, silicon tetrabromide, arsenic trichloride, arsenic tribromide, antimony pentachloride and combinations thereof, in a manner to minimize the possibility of contamination of the liquid including the avoidance of exposure to the atmosphere, said method comprising:

acquiring said liquid in a bubbler container from a supplier of said liquid, said container being made of quartz or other material which is inert with respect to said liqud, said container having an inlet tube which extends into said container adjacent the upper end of said container and terminates adjacent the lower end of said container so as to be immersed in said liquid, and an outlet tube extending out of the upper end of said container, each of said tubes having a liquid-tight seal formed adjacent its upper end, said container having been shipped from the location where the liquid is added to the container to the user of the liquid with said seals being closed when the container is shipped;

connecting the upper end of said inlet and outlet tubes to a system employed for the manufacture of semiconductor devices while said seals remain closed;

applying purging means to said connections and the upper ends of said inlet and outlet tubes to purge said tubes outwardly from said liquid-tight seals of moisture and atmosphere accumulated therein;

opening said seals by means disposed within said tubes and movable by external means, not requiring access to the interior of said tube, to expose said liquid to said system without exposing said liquid to the atmosphere around the container; and applying a carrier gas into the inlet tube, said gas traveling through said inlet tube, bubbling upward through said liquid and exiting said container through said outlet tube.

* * * * *